Dec. 26, 1967   H. B. CUMMINGS   3,360,102
KILN LOADER AND UNLOADER
Filed June 17, 1964   13 Sheets-Sheet 1

INVENTOR.
HOWARD B. CUMMINGS
BY
ATTORNEYS

Dec. 26, 1967     H. B. CUMMINGS     3,360,102
KILN LOADER AND UNLOADER
Filed June 17, 1964     13 Sheets-Sheet 2

INVENTOR.
HOWARD B. CUMMINGS
ATTORNEYS

INVENTOR.
HOWARD B. CUMMINGS
BY
ATTORNEYS

Dec. 26, 1967
H. B. CUMMINGS
3,360,102
KILN LOADER AND UNLOADER
Filed June 17, 1964
13 Sheets-Sheet 10
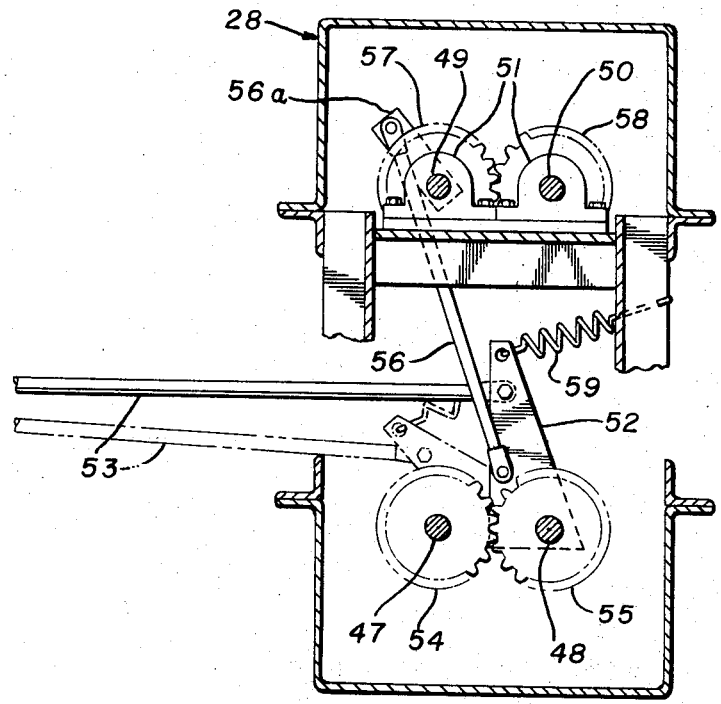
FIG. II
INVENTOR.
HOWARD B. CUMMINGS
BY
ATTORNEYS

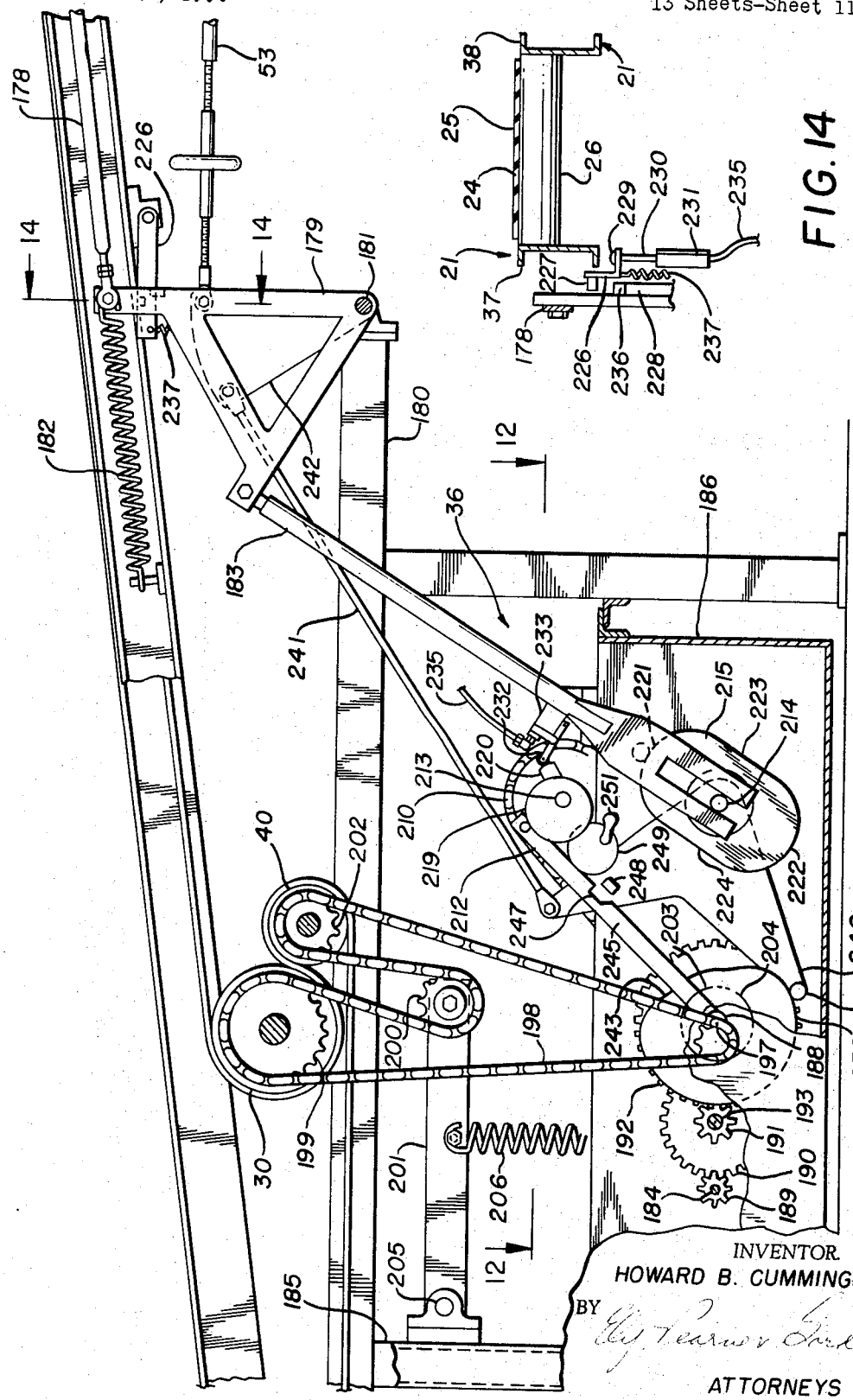

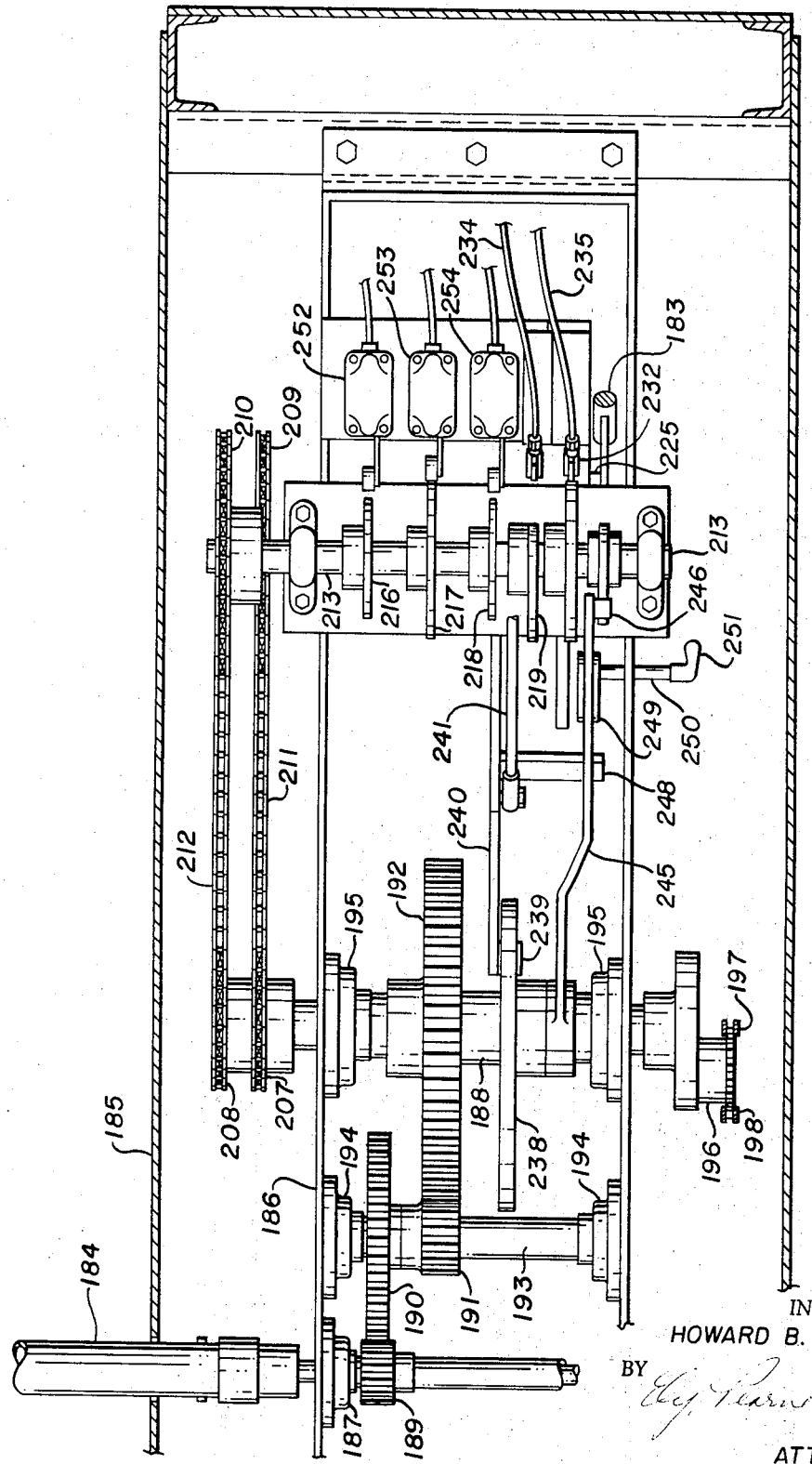

United States Patent Office 3,360,102
Patented Dec. 26, 1967

3,360,102
KILN LOADER AND UNLOADER
Howard B. Cummings, New Castle, Pa., assignor to Shenango Ceramics, Inc., New Castle, Pa., a corporation of Pennsylvania
Filed June 17, 1964, Ser. No. 375,832
9 Claims. (Cl. 198—31)

This invention relates to conveying means and more particularly to a machine for transferring ware to and from a continuously moving bed of a tunnel kiln.

In the manufacture of ceramic ware, unglazed ware (bisque ware or green ware, in the case of so-called semi-vitreous ware) is normally glazed by spraying a suitable liquid glaze onto the ware, drying the glaze, and then firing the ware in a suitable kiln. The cost of production (involving the investment in labor and material in goods in process, quality of ware produced, and rate of ware production per dollar invested in plants and equipment) between the stage of glazing and removal of fired ware from the kiln has long been a major obstacle to ceramic manufacturers in high labor-cost countries in their efforts to compete with ware imported from low labor-cost countries, on the one hand, and substitutes, such as plastic and glass products on the other hand. This obstacle to the efficient production in the required handling of ware immediately prior to firing, during firing, and removal from the kiln for the glost fire (in the case of fully vitrified wares) or the semi-vitreous fire was, of course, repeated when the ware had to be provided with an over-glaze decoration and was, therefore, subjected to a decorating fire.

A major break-through in the above outlined production problem appeared to have been obtained by the invention and development of the tunnel kiln as disclosed in the United States Patent of David E. Tomkins, No. 2,964,822 and the method of operating a modification of said tunnel kiln as disclosed in the copending application of said Tomkins, Serial No. 95,192, filed March 13, 1961. Said kiln and the method of operating it permitted the single-high loading of ware on a continuously moving bed, thereby eliminating the theretofore conventional operations of bunging ware in saggers and loading the saggers on kiln cars prior to firing and the subsequent operation of unloading the kiln cars and removing the ware from the saggers; still further, said tunnel kiln may be operated so that ware, of improved quality and lower loss during firing, may be fully fired in a period of time measured in minutes, rather than hours or days.

Theoretically, the production capacity of one of the above briefly described single-high fast-fire tunnel kilns should be that of several conventional kilns requiring the loading and unloading of bunged ware and would require only one loading crew and one unloading crew, as contrasted with the plurality of such crews for the plurality of conventional kilns it can replace. Unfortunately, such production potential could not be realized, either by hand loading and unloading with competent crews or with any available mechanical equipment. The materials handling problem preventing achievement of full production potential of the above described preferred kiln to be used with this invention has also been one of long standing (though its seriousness has apparently only been recently fully realized) with respect to prior kilns, straight-line or circular, in which the ware has been loaded and unloaded, one-article high, on a conveyor running through the kiln and providing, at the entrance and exit of the kiln, stations at which ware is placed on and removed from a moving flat bed. Indeed, the problem solved by this invention, and whether or not it was previously even appreciated, let alone unsolved, has been one of the major obstacles to obtaining the advantages of so-called "single-high" firing, many of which advantages have been long hoped for but seldom obtained in actual production.

Essentially the problem solved by this invention is as follows: In tunnel kilns in which ware is placed on a conveyor providing a moving bed in the kiln, the economics of kiln construction and operation usually requires a bed of such width that ware cannot be manually placed safely by an operator or operators standing on one side of the bed, especially when the bed is moving at a fairly high rate of speed set by the firing rate of the kiln. This requirement of conveyor width is particularly true when the kiln must be flexible to accommodate ware of widely varying sizes and shapes, as in a dinnerware plant, in which over-all sizes of ware may vary from butter dishes to platters and the shapes may vary from plates to hollow ware such as cups and bowls, tea pots, etc. The practical maximum width of a conveyor which could be loaded from both sides (necessitating duplicate lines for handling ware to and from the loading and unloading station) also necessarily limited the maximum width of single-high firing kilns to kilns whose conveyor could be loaded from the center to one side.

There is one aspect of the problem of loading ware on the moving conveyor beds of single high firing kilns which, if it and its effect on operating efficiency has been appreciated and considered at all, has heretofore been unsolved. This is the problem of placing the ware in a pattern such that, for ware of a given size on a conveyor of a given width, the pieces of ware will not touch while being conveyed through the kiln but the maximum number of pieces will be conveyed in a given period of time. In its simplest form, i.e. where the width of the conveyor is several times the maximum overall dimension of a given size of circular ware to be fired, the pattern is such that the centers of the ware (or, more precisely, the centers of gravity of each horizontal area occupied by a piece of ware) lie in a regular hexagonal pattern whose diagonal centerlines are at 60° to the length of the conveyor. The effect of placing ware precisely in such a pattern with a machine made according to this invention, as against hand placement, proved most startling. In comparison with hand placement in an attempt to match the same pattern in a test in which the conveyor was run at a rate which was not a speed-up rate for skilled hand loaders and the ware and other conditions were equal, use of a machine according to this invention increases the kiln output by 30%.

The problem of achieving the optimum pattern of placement is also complicated by the following factors: For generally circular ware of sizes up to a maximum size which can be placed most effectively in a hexagonal pattern on a conveyor of a given width the hexagonal pattern should be maintained but the centers must be moved closer together to achieve optimum "packing." Depending upon the sizes and shapes of certain pieces of ware and even larger circular or elliptical shapes, not only must the centers vary, but the angle of a line through a center or centers of pieces may vary up to 90° with respect to the run of the conveyor.

It is an object and advantage of this invention to provide a machine designed for the width of the conveyor of a single-high firing kiln in a pattern which will automatically place ware in a pattern providing optimum packing of the ware on the conveyor.

It is a further advantage and object of this invention that machines made according to it may be set to handle runs of different sizes of ware varying, for a given conveyor width, from a minimum size dictated by the inertia of the parts of the machine to a maximum size dictated by the width of the conveyor and so that, for a specific size and shape of ware in a run, the machine may be adjusted to place the ware precisely on centers spaced with respect to each other and with respect to the run of the conveyor to achieve maximum packing of the ware.

It is a further object and advantage of this invention that ware may be loaded from a straight-line conveyor in which the ware is conventionally conveyed in single file from a jigger or other ware-forming machine, glazing machine, or other prior operation, and unloaded onto a belt conveyor on which the ware may be conveyed single file to a subsequent operation, such as a glazing machine, decorating operation, or inspection and packing. As a consequence, not only may the labor heretofore involved in such ware handling operations be substantially eliminated, but the duplication of equipment and complications involved in setting up parallel lines for loading and unloading ware from opposite sides of the kiln conveyor is eliminated.

Still further, due to this invention the effective internal width of the single-high firing kiln is no longer limited to that of a conveyor which can be manually loaded and unloaded from opposite sides of the conveyor. Instead, up to a limit dictated by the inertia of a transfer arm in swinging from a pick-up position to a depositing position and the capacity of accessory attachments to absorb and dissipate, within the period of time required for such periodic movements of the transfer arm, the energy involved in stopping the swinging transfer arm at such positions, the internal width of a single-high kiln may be designed to other economies of building and operating the kiln. In other words, the production capacity of a kiln is frequently rated at the number of average size pieces of the ware produced by the manufacturer per hour of operation. However, since the actual mass of ware being fired in a kiln is normally negligible, a more meaningful rating for the production capacity of a single-high firing kiln (assuming the optimum packing of the conveyor obtainable with this invention) would be the square footage of conveyor passed through the kiln per hour. On the basis of this rating, it should be apparent that with the effective internal width of a kiln limited by the width of a conveyor which can be manually loaded and unloaded, an upper limit on the capacity of one single-high firing kiln has heretofore been the speed at which the conveyor can be safely operated, requiring a great length of kiln to provide the necessary residence time of the ware in the successive heating and cooling zones in the kiln. Due to the greater kiln widths allowed by the wider conveyors which can be loaded and unloaded by this invention, equal capacity can be obtained with slower conveyor speeds and shorter kilns. Even without its other advantages, the ability of this invention to permit large capacity kilns of relatively short length to be installed in existing buildings may often dictate its use.

An advantage of this invention is that it may be readily adopted to the periodic outputs of existing ware unloaders, ware forming machines, and/or glazing machines to provide an uninterrupted flow of ware to the kiln, thereby substantially increasing the production capacity of both the glazing machine and the kiln.

Other objects and advantages of the invention will appear from the following description of one example of the invention.

In the drawings:

FIGURE 11 is a sectional view, the plane of the section being indicated by the line 11—11 in FIGURE 10;

FIGURE 12 is a sectional view, the plane of the section being indicated by the line 12—12 in FIGURE 2;

FIGURE 13 is a sectional view, the plane of the section being indicated by the line 13—13 in FIGURE 12;

FIGURE 14 is a sectional view, the plane of the section being indicated by the line 14—14 in FIGURE 12.

*General organization*

Figure 1:
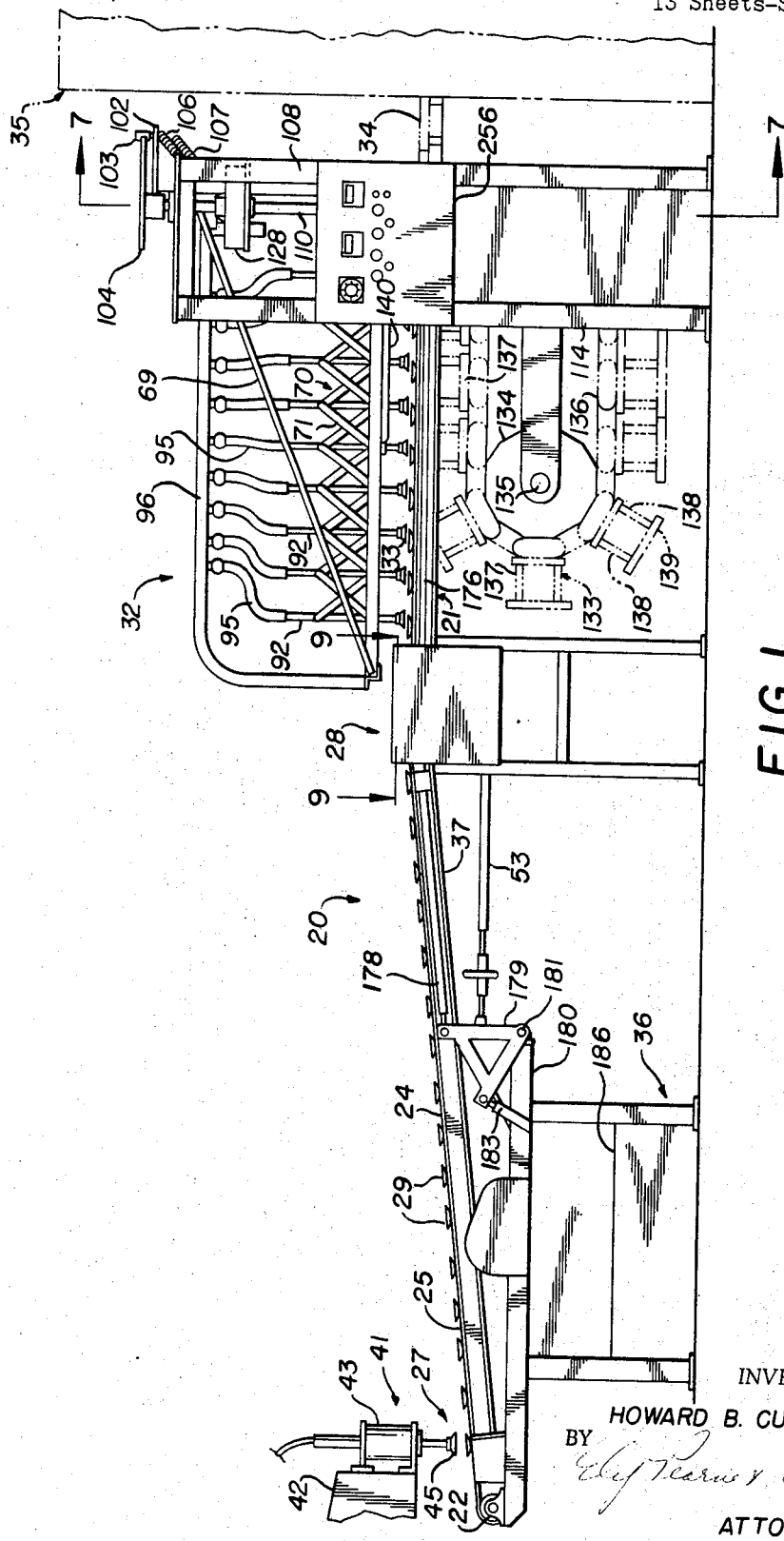
FIGURE 1 is a side elevation of a machine embodying the invention and located at the entrance end of a kiln for loading the kiln conveyor.

In the following description of the illustrated embodiment of the invention; the various parts will be designated by reference numerals, and, in many instances, the figures in which those parts may be more prominently found will be designated parenthetically. For example, when reference is made to a "conveyor belt 24 (1–5, 9, 10, 12)" the part in question is indicated by the reference numeral 24 in the drawings and may be prominently or clearly found in FIGURES 1, 2, 3, 4, 5, 9, 10, and 12.

Figure 2:
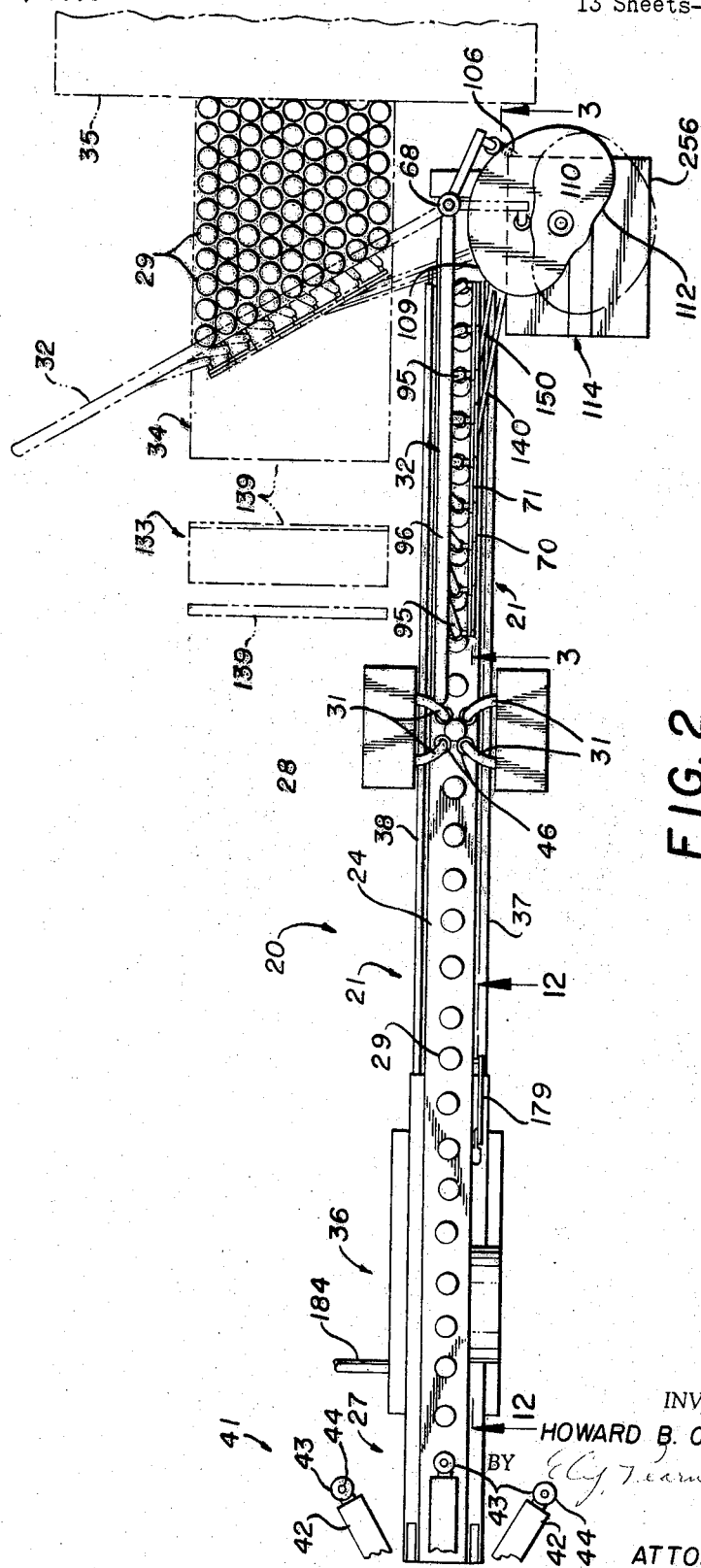
FIGURE 2 is a top plan view of the kiln loader shown in FIGURE 1.

The portion of a machine 20 for performing a kiln-loading operation is most clearly seen in FIGURES 1 and 2 and includes a conveyor belt frame 21 (1, 4, 5, 7, 9, 10, 12) which extends substantially the entire length of the loading machine 20. Idling head pulleys 22 (1) and 23 (3), respectively, are located at either end of the conveyor frame 21. An endless conveyor belt 24 (1–5, 9, 10, 12) runs over the pulleys 22 and 23 and has an upper conveying reach 25 (1–5, 9, 10, 12) which is supported by cylindrical carrying idlers 26 (3–5, 7, 9, 10, 12, 14) which are attached to the frame 21.

The upper reach 25 of the belt 24 is inclined upwardly from the loading station 27 (1, 2) for the belt to a ware centering station 28 (1, 2, 9, 10). Ware 29 in the particular installation shown for a glost kiln has been removed from the spindles to a glazing table (not shown) and may be loaded onto the belt 24 at the loading station 27 by hand but preferably is loaded by a ware loading and unloading device, such as the ware loading and unloading machine described in the copending application of Howard B. Cummings, Ser. No. 186,536. In either case the ware is spaced on approximately equidistant centers on the belt 24. This approximate equidistant spacing of the ware on the belt is achieved by intermittently driving the belt 24 by an intermittently actuated drive roll 30 (12) and placing a piece of ware on the belt at the station 27 during a dwell period as the belt is advanced from left to right (as viewed in FIG. 1).

The ware 29 is thus incrementally advanced to the ware centering station 28 where it is precisely centered with the desired spacing on the belt 24. The ware centering station 28 includes four centering and spacing arms 31 (2, 9, 10) which advance from the position shown in phantom outline in FIGURE 9 to the position shown in solid lines in FIGURES 9 and 2.

The conveyor belt 24 and frame 21 are horizontal from the input side of the centering station 28 to the idling head pulley 23. The horizontal portion of the belt extending from the output side of the centering station 28 to the idling head pulley comprises a belt delivery station.

When a predetermined number of spaced and centered pieces of ware are placed at the delivery station and when the belt is in a dwell condition, a ware transfer frame or arm 32 (1–3) lowers to pick the ware off the table. The ware transfer frame 32 includes a plurality of depending, spaced vacuum cups 32 (1, 3, 4) which firmly grip the ware. The frame raises from its lowered position and then usually swings through an angle of sixty degrees to the position shown in phantom outline in FIGURE 2. When the frame 32 reaches this position, the frame 31 once again lowers, the vacuum in the cups 33 is released and the ware is deposited on a continuously moving conveyor bed 34 (2, 5) of a straight-line tunnel kiln 35 (1, 2). After the ware has been deposited in this manner, the frame 32 once again retracts and returns to its position spaced above the delivery table.

The periodic movement of the belt 24, the operation and movement of the frame 32, the operation of the centering arms 31 and the vacuum applied to the cups 33, are all controlled to operate in a predetermined sequence from an actuating station 36 (1, 2, 12, 13).

At the exit of the kiln, a second arm (not shown) similar to the arm 32 and provided with similar vacuum cups may be stationed and swung synchronously with the arm 32 to pick up ware and unload it from the kiln into a belt running alongside a run of the conveyor bed 34 extending beyond the exit of the kiln. The ware unloading position of the machine is not shown since it may comprise a duplicate of the arm 32, vacuum cups 33 and its associated mechanism for swinging the arm and spacing its vacuum cups corresponding to the cups 33 all controlled from the actuating station 36 so that the vacuum on the cups at the unloading station is applied to pick up ware from the kiln conveyor bed and deposit it on a belt conveying the ware to a subsequent operation. Whether the belt (not shown) for conveying ware away from the kiln is continuously driven or intermittently driven in synchronism with the belt 24 is a matter of choice depending upon the subsequent operations to be performed on the ware. Since the operations on the ware immediately subsequent to removal from the kiln seldom require precise spacing of the ware, a centering station and its associated mechanism corresponding to the station 28 and its actuating mechanism may usually be omitted from the otherwise general duplicate of the loading mechanism shown in FIGURES 1 and 2.

*Conveyor assembly*

The conveyor assembly comprises the conveyor belt frame 21 which includes spaced, parallel channel beams 37 and 38 (1, 4, 5, 7, 9, 10, 12), the endless conveyor belt 24, and the head pulleys 22 and 23. The endless conveyor belt 24 extends longitudinally between the channel beams 37 and 38 and has its upper reach 25 supported between the head pulleys 22 and 23, by the cylindrical idling pulleys 26. The lower reach of the belt 24 is supported by cylindrical idling pulleys 39 (3). As may be seen more clearly in FIGURE 12 a portion of the lower reach of the belt 24 is wrapped around the drive roll 30 and an idling roll 40 (12). In a manner which will be more fully explained below, the roll 30 intermittently drives the lower reach of the belt 24 to advance the upper reach 25 of the belt to the right in equal increments (of eight inches in the specific embodiment shown in FIGURES 1 and 2).

*Loading station*

Ceramic ware 29 is placed on the belt 24 at the loading station 27. If the ware is to be placed on the belt 24 by hand, the belt may be marked with suitable ware locating indicia (not shown) to aid in the placing of ware on approximate eight inch centers. To eliminate the unskilled manual labor involved in such a loading operation, however, the ware is preferably loaded onto the belt at the loading station by a ware loading and unloading device. Such a device, disclosed more fully in the copending application of Howard B. Cummings, Ser. No. 186,536, may include a plurality of ware pick-up means which rotate about a main shaft. A ware pick-up means 41 (1, 2) of the type disclosed in the Cummings application is shown in FIGURES 1 and 2. The pick-up means 41 includes a ware transport arm 42, a pneumatic cylinder 43 mounted on the end of the transport arm, a hollow piston 44 axially extending through the cylinder, and a suction cup 45 mounted on the lower end of the piston. The pick-up means 41 transfers ware to the belt 24 by means of a vacuum applied to the suction cup 45. When a ware transport arm 42 is over the centerline of the belt 24 the arm will dwell and the vacuum will be released to drop the ware onto the belt 24. By turning the rotation of the transport arms 42 of a ware unloader with the intermittent drive of the belt 24 so that a piece of ware will be dropped during a dwell in the drive of the belt 24, the ware 29 will be spaced on the belt on approximate eight inch centers.

*Ware centering and spacing*

The ware that has been placed on the belt in the foregoing manner is conveyed by the intermittently advancing belt to position a piece of ware in the centering and spacing station 28 during each dwell period. During each dwell period four centering and spacing arms 31 advance from their retracted position, shown in phantom outline in FIGURE 9, to the extended position shown where the arms 31 contact each piece 29 at its periphery to accurately center and space it.

The arms 31 are provided with soft discs 46 (1, 10) of rubber or the like at their ware contacting ends. The arms 31 are adjustably fixed respectively at their opposite ends to actuating shafts 47, 48, 49, and 50 (9–11). The actuating shafts 47–50 are mounted for axial rotation in pillow blocks 51 (10, 11). The actuating shaft 47 is axially rotated in a counter-clockwise direction to advance its arm 31 from its retracted position to its ware centering and spacing position. To this end, a linkage member 52 (10, 11) is fixed to the lower end of the rod 47. Movement of the member 52 from the position shown in phantom outline in FIGURE 11 to the position indicated by the solid lines by a rod 53 (1, 10, 11) which is pivoted to the member 52 causes the above described axial rotation of the shaft 47.

A spur gear 54 (10, 11) is fixed to the shaft 47 and meshes with an identical spur gear 55 (11) which is fixed to the shaft 48. The counter-clockwise movement of the gear 54 imparts a clockwise movement to the gear 55 and to the rod 48. Thus the arms 31 which are fixed to the shafts 47 and 48 are advanced simultaneously upon actuation of the rod 53 to the left as viewed in FIGURE 11.

A rod 56 (10, 11) is pivoted to the member 52 and to a link 56a (10, 11). The link 56a is fixed to the rod 56 so that movement of the rod 53 and member 52 to the left, as viewed in FIGURE 11, causes the shaft 49 to axially rotate in a counter-clockwise direction to advance its arm 31 from its position indicated in phantom outline. A spur gear 57 (10, 11) fixed to the rod 49 meshes with an identical spur gear 58 (11) which is, in turn, fixed to the rod 50. The counter-clockwise movement of the gear 57 imparts a clockwise movement to the gear 58 and to the rod 50. Thus all the arms 31 are advanced simultaneously with respect to each other upon actuation of rod 53 in the above described direction.

The above described precise centering action of the belt obviously must occur momentarily during the dwell period and the centering arms must be retracted to their withdrawn position before the belt 24 commences its next intermittent advance. Thus the rod 53 is actuated by momentarily releasing it during the dwell period from the tension normally applied just before and maintained during each period of advance of the belt 24. This permits the rod 53 to be actuated by the tension spring 59, which, in turn, allows the centering arms 31 and their associated gearing and linkage to advance until further movement is stopped by centering engagement of the arms 31 against the ware. Since the centering force is all supplied by the tension on the spring 59, the centering station will accommodate centering the many pieces in runs of ware of different sizes and accommodate minor variations in size in ware of generally the same size in any given run.

Ware transfer arm

The ware units are incrementally advanced from the centering station 28 to the horizontal portion of the belt 24 which extends from the output side of the centering station 28 to the idling head pulley 23. This portion of the belt comprises a ware delivery station and is located below and in vertical alignment with the ware transfer arm 32 when the arm is swung to its pick-up position.

The ware transfer arm frame 32 includes a lower support and guide track 60 (1, 3, 4) which comprises a pair of spaced, parallel angle iron members 61 and 62 (3, 4). The angle iron members 61 and 62 are fixed at one end to a vertical column 63 (3, 7). The column 63 has upper and lower projections 64 and 65 (3, 7) respectively, which are pivoted by flanged cartridge bearings 66 and 67 (3, 7) to a support shaft 68 (3, 7). A tie rod 69 (1, 3) is fixed to the column 63 and extends diagonally downward to the other end of the angle iron members 61 and 62. The tie rod 69 adds rigidity to the ware transfer frame 32 and maintains the support and guide track 60 in parallelism with the horizontal portion of the belt 24.

A lazy-tong frame 70 (1, 3, 4) is mounted for longitudinal reciprocation along the guide track 60. The lazy-tong frame 70 comprises a first set of cross links 71 (1, 3, 4) which are pivoted to each other at their ends by upper and lower pivot bars 72 and 73 (3, 4) respectively at their mid-points by pivot pins 74 (3, 4). Each link 71 is mounted on its pivot pins 74 and its pivot bars 72 and 73 by bushings 75 (4). The lazy-tong frame 70 also includes a second set of cross links 76 (4) which are pivoted to each other at their ends by the upper and lower pivot bars 72 and 73, respectively, and at their mid-points by the pivot pins 74. Each link 76 is mounted on its pivot pins 74 and its pivot bars 72 and 73 by bushings 77 (4).

Each lower pivot bar 73 is provided at both ends with a roller bearing 78 (4) and a resilient spacer button 79 (4). The bearings 78 mount each lower pivot bar 73 for travel along an inwardly projecting horizontal leg portion 80 (4) of each angle iron member 61 and 62. The spacer buttons 79 serve as lateral guides for each lower pivot bar 73 along a vertical leg portion 81 (4) of each angle iron member 61 and 62.

Tubular spindle housings 82, 83, 84, 85, 86, 87, 88, 89, and 90 (3, 4) are fixed to each lower pivot bar 73 and extend through each upper pivot bar 72. Each spindle housing 82–90 is slidably mounted with respect to its upper pivot bar 72 by a bushing 91 (4) so that each housing 82–90 will remain in a fixed position relative to its lower pivot bar 73 and each upper pivot bar 72 will slide with respect to its spindle housing 82–90 upon reciprocation of the lazy-tong frame 70 in its guide track 60.

A tubular ware pick-up spindle 92 (1, 3, 4, 5) extends through the bore of each spindle housing 82–90. The outside diameter of each spindle 92 is less than the inside diameter of each spindle housing 82–90 so that each spindle 92 forms a loose fit with its housing. Upper and lower friction bearings 93 and 94 (4), respectively, are provided in each housing bore to grip a spindle 92. The spindles 92 may be axially adjusted by hand to any desired position relative to the horizontal portion of the belt 24. Preferably a locking device (not shown) is provided between each spindle 92 and its spindle housing to mechanically lock each spindle 92 in its adjusted position relative to its spindle housing.

A flexible tube 95 (1–4) is connected to the upper end of each of the spindles 92 and each tube 95 is in turn connected to a vacuum manifold 96 (1–3). Shut-off valves 97 (3) are provided on the manifold 96 for each tube 95.

The manifold 96 is fixed at one end to the column 63 by a bracket 98 (3) and a flexible hose 99 (3) leads from that end of the manifold 96 to a vacuum source (not shown) to a two-way, solenoid operated, porting valve 100 (3) provided in the manifold 96 for a purpose which will hereinafter become apparent. The other end of the manifold 96 is blocked and is fixed to the free end of the guide track 60 to add rigidity to the transfer frame 32.

The lower end of each spindle 92 is provided with a removable vacuum cup 33. The size of the vacuum cups 33 may be varied to accommodate varying sizes of ware units.

Ware transfer arm actuating mechanism

A cam roller arm 102 (1–3, 7) is fixed to and extends from the vertical column 63 and is provided with a cylindrical cam roller 103 (1–3, 7) at its free end. The cam roller 103 is biased against a peripheral cam track 104 (2, 7) of a cam plate 105 (1, 2, 7) coil springs 106 (2, 7) and 107 (1–3, 7) which extend from the cam roller arm 102 to a frame member 108 (1, 2, 7). As may be seen in FIGURE 2, an arcuate portion 109 (2) of the cam track 104 retains the cam roller 103, its arm 102, and the associated ware transfer frame 32 in a position of vertical alignment with the horizontal portion of the belt 24. The cam plate 105 is fixed to a shaft 110 (1, 7) which is periodically rotated by a motor 111 (1, 15). As the cam plate 105 is rotated in a clockwise direction, as viewed in FIGURE 2, and when the cam roller 102 begins to follow a non-arcuate portion 112 (2) of the cam track 104, the ware transfer frame 32 will swing through an angle of sixty degrees until it reaches the position shown in phantom outline in FIGURE 2. Continued rotation of the cam plate 105 moves the ware transfer frame 32 back over the belt 24.

The shaft 68, on which the ware transfer frame 32 is pivoted, is fixed at both ends to an axially reciprocatable column 113 (7). The column 113 is slidably mounted at both ends with respect to a main support structure 114 (1, 7) by upper and lower rollers 115 and 116 (7) respectively. The upper roller 115 is mounted on a pin 117 (7) which is fixed to a top cross piece 118 (7) of the support structure 114. The upper roller 115 runs in a track which is defined by a portion of the side of the column 113, projections 119 (7) fixed to the column 113, and a retainer bar 120 (7) which is fixed to the projections 119. The lower roller 116 is mounted on a pin 121 (7) which is fixed to an intermediate cross piece 122 of the support structure 114. The lower roller 116 runs in a track which is defined by a portion of the side of the column 113, projections 123 (7) fixed to the column 113, and a retainer bar 124 (7) which is fixed to the projections 123. Additional guide rollers, such as lower guide rollers 125 (7) and 126 which are fixed to the cross piece 122 and which bear on the column 113, may be provided.

The column 113 is also supported by a roller cam follower 127 (7) which bears on the upper periphery of a barrel cam 128 (1, 7). The column 113 is further supported at its lower end by a piston rod 129 (7). The piston rod 129 is fixed to a piston (not shown) which is slidable in a pneumatic cylinder 130 (7). The upper periphery of the barrel cam 128 is provided with radially opposed recessed portions 131 and 132 (7). The barrel cam 128 is fixed to the shaft 110 so that the recessed portion 131 is symmetrical with respect to an imaginary vertical plane which passes through the axes of the shafts 110 and 68 when the cam roller 102 contacts the midpoint of the arcuate portion 109 of the cam track 104.

As will hereinafter become apparent, the clockwise, single rotational cycle of the shaft 110 and its cams 105 and 128 begins and ends when a predetermined number of ware units are located on the horizontal portion of the belt, when the belt is dwelling, and when the roller cam follower 127 is in a position to drop into the recessed portion 131 of the barrel cam upon a slight, clockwise rotational movement of the barrel cam 128. Thus, when a predetermined number of ware units are on the horizontal portion of the belt, the motor 111 will be energized to axially rotate the cams 105 and 128. When the motor 111 is energized the valve 100 will be activated to connect the manifold 76 and each vacuum cup 33 to the vacuum source. While the cam roller 103 is riding on the arcuate portion 109 of the cam plate 105 and the ware transfer frame 32 is thereby held over the horizontal portion of the belt 24, the cam follower 127 will drop into the recess 131 on the barrel cam 128 and the column will drop a distance which corresponds to the depth of the recess 131. The downward movement of the column 113 is resiliently resisted by the pressure of the air which is compressed within the cylinder 130 by its piston.

Since the pivot shaft 68 is fixed to the column 113, the entire ware transfer frame 32 and the attached spindles 92 will be lowered so that the vacuum cups 33 contact the ware units 29. After each ware unit 29 has been engaged by its vacuum cup 33, the roller cam follower 127 rides out of the recess 131 to thereby lift the ware transfer frame 32 and the ware units 29 attached thereto. The continued counter-clockwise rotation of the cam plate 105 will cause the cam roller 103 to follow the non-arcuate portion 112 of the cam plate 105 and permit the springs 106 and 107 to swing the ware transfer frame 32 through a sixty degree angle to the position shown in phantom outline in FIGURES 2 and 5. In this phantom outline position the ware transfer frame is positioned over the continuously moving conveyor bed 34 of the tunnel kiln 35 and is at a sixty degree angle with respect to the direction of movement of the bed 34, since, for the round ware 29 having a relatively small diameter with respect to the width of the bed 34, as shown, this permits the closest "packing" of the ware on the bed. As stated at the outset, however, if the ware is rectangular or octagonal, closest packing is obtained by placing the ware so that the centerline of each row will be perpendicular to the travel of the bed. Swinging of the arms to either a 60° or 90° position will normally effect the most compact packing of the ware on the bed, but the position to which the arm is swung is preferably adjustable to any angle less than 90° down to the smallest angle at which the arm may span the bed in order to pack ware whose shape, in size relation to the width of the bed, requires packing singly or in rows at angles other than 60° and 90°.

The tunnel kiln 35 is a straight line kiln for single-high firing of ware. The kiln 35 is preferably of the type disclosed in United States Patents No. 2,974,387, but forms no part of the present invention. The kiln 35 includes a number of tunnel cars 133 (1, 2) which are entrained and guided for movement in upright positions through the firing tunnel of the kiln 35 and in an inverted position along a return reach immediately below the firing tunnel. Sprockets 134 (1) are provided at both ends of the tunnel kiln 35 (one of which is shown in the drawings). The sprocket 134 illustrated is mounted on a drive shaft 135 (1) which is connected to a power drive (not shown). An endless link chain 136 (1) is trained around the sprocket 134 at the feed end of the tunnel kiln 35 and the sprocket (not shown) at the other end of the tunnel kiln. The cars 133 are mounted on the chain 136 for movement therewith and each car 133 includes a deck portion 137 (1), ceramic columns 138 (1) and a ceramic platform 139 (1, 2, 5). When the cars 133 are in an upright position the individual ceramic platforms 139 form the flat, horizontal, and continuously moving bed 34. This bed 34 extends beyond the in-feed end of the tunnel kiln 35 so that the bed may be conveniently loaded by the ware transfer arm 32.

The speed at which the belt 24 periodically advances is timed with the movement of the bed through the tunnel kiln 35, the heat treating time of each ware unit 29 being the determining factor for the speed at which the bed 34 is continuously advanced through the tunnel kiln. Therefore, the speed of the belt 24 and the entire ware loading system is tied to the speed of the bed 34 and to the size of the ware 29 so that ware is placed on the bed in a closely spaced relationship as is shown in FIGURES 2 and 5.

*Spindle spacing and centering mechanism*

Figure 5:
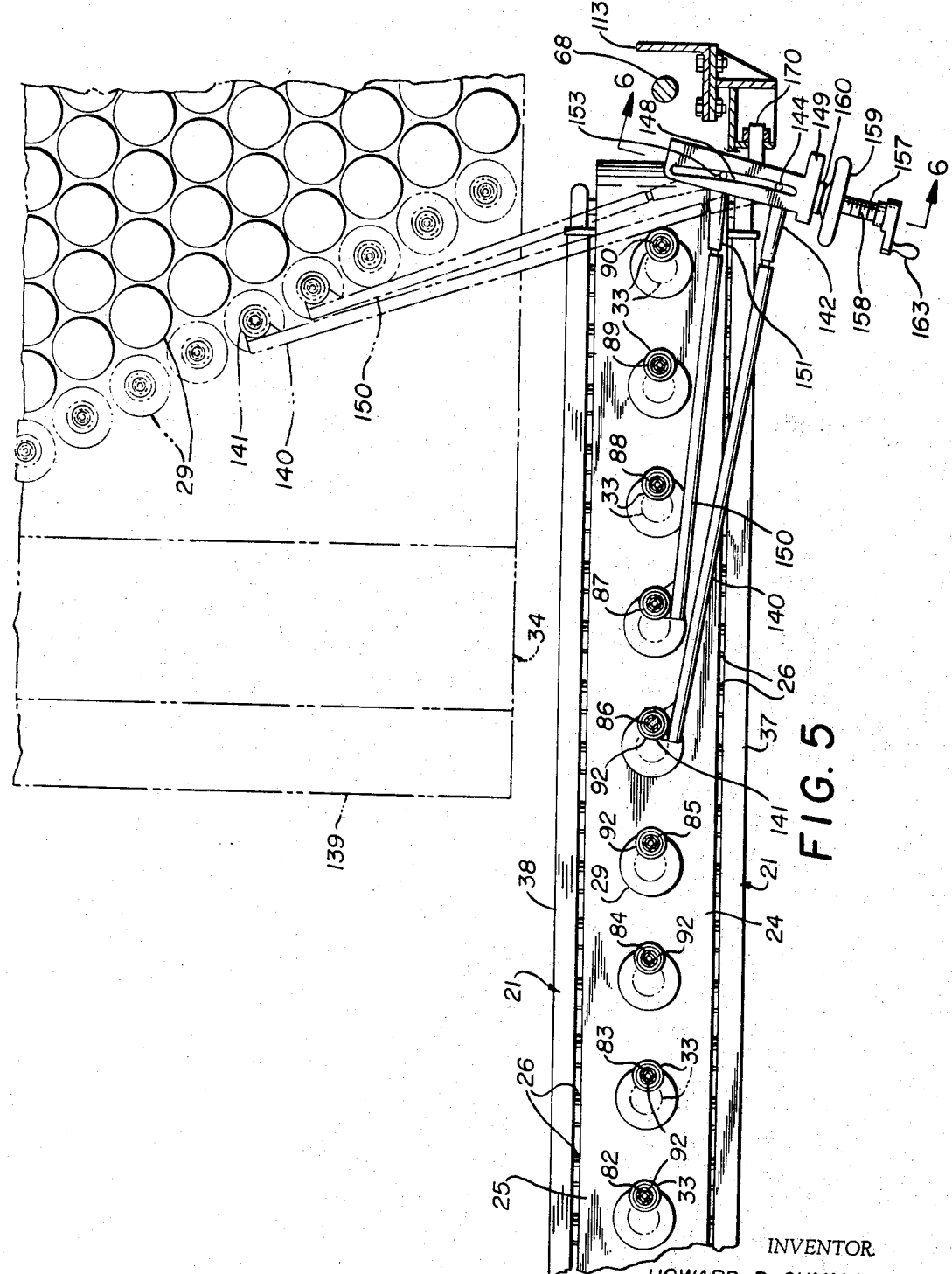
FIGURE 5 is a sectional view, the plane of the section being indicated by the line 5—5 in FIGURE 3.
Figure 6:
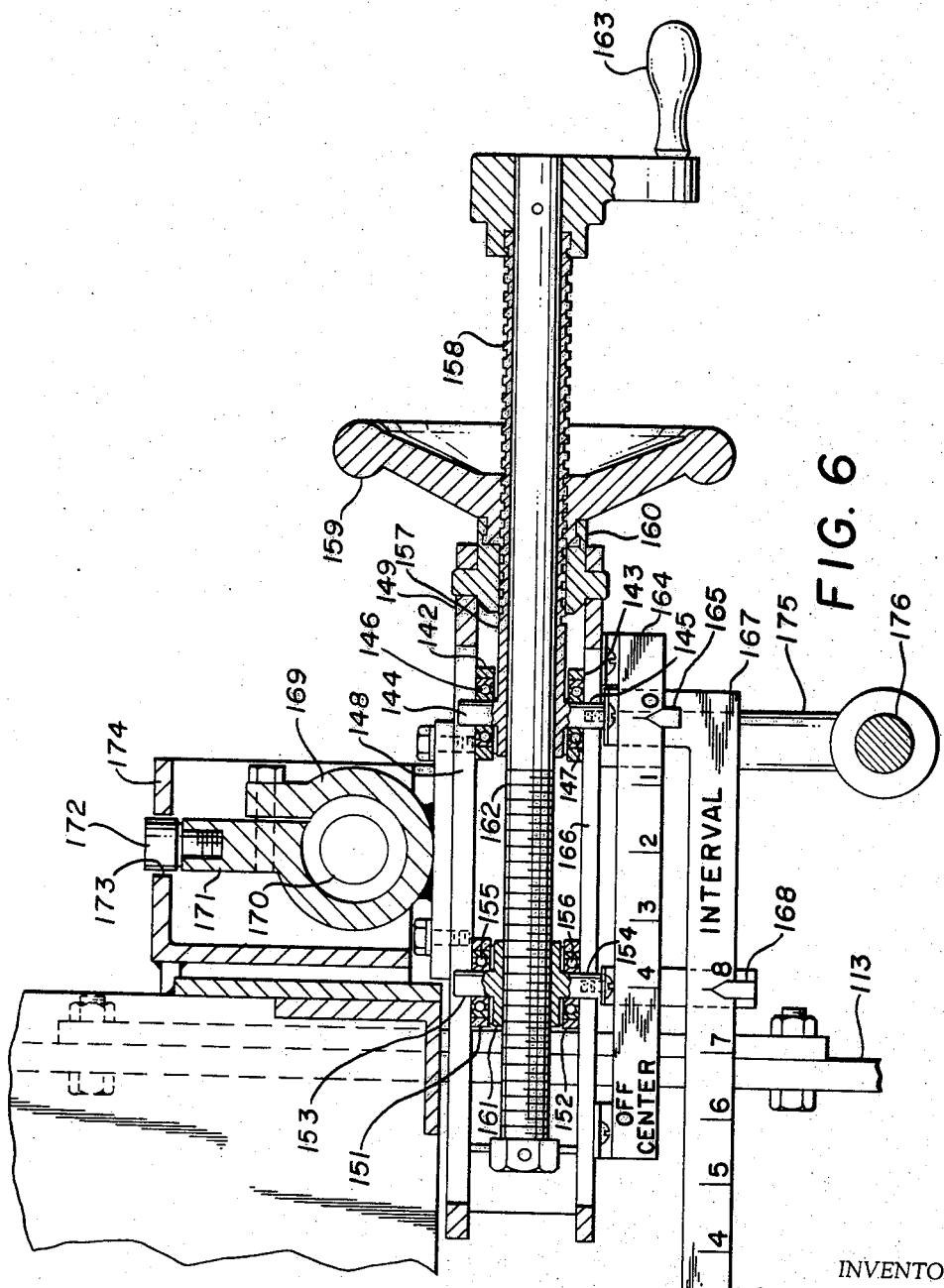
FIGURE 6 is a sectional view, the plane of the section being indicated by the line 6—6 in FIGURE 5.
Figure 7:
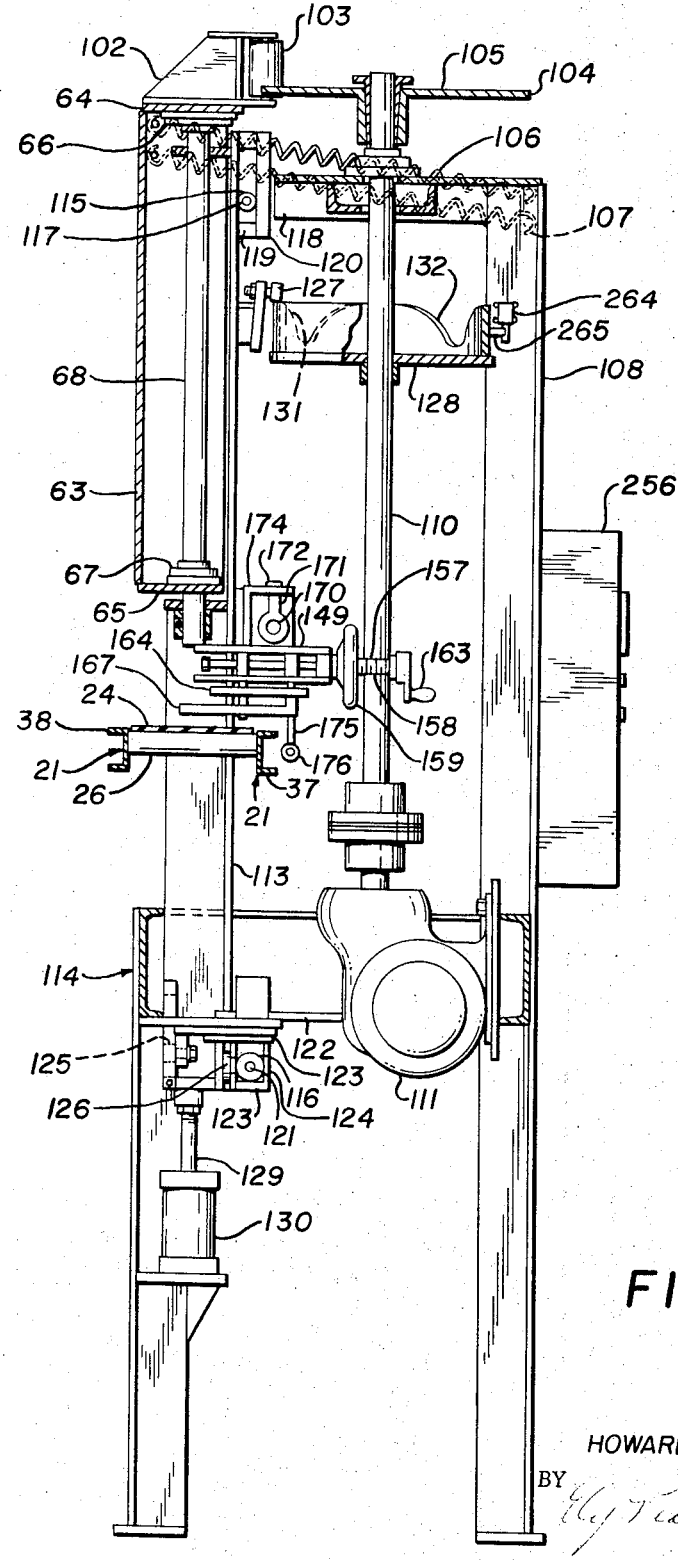
FIGURE 7 is a sectional view, the plane of the section being indicated by the line 7—7 in FIGURE 1.
Figure 8:
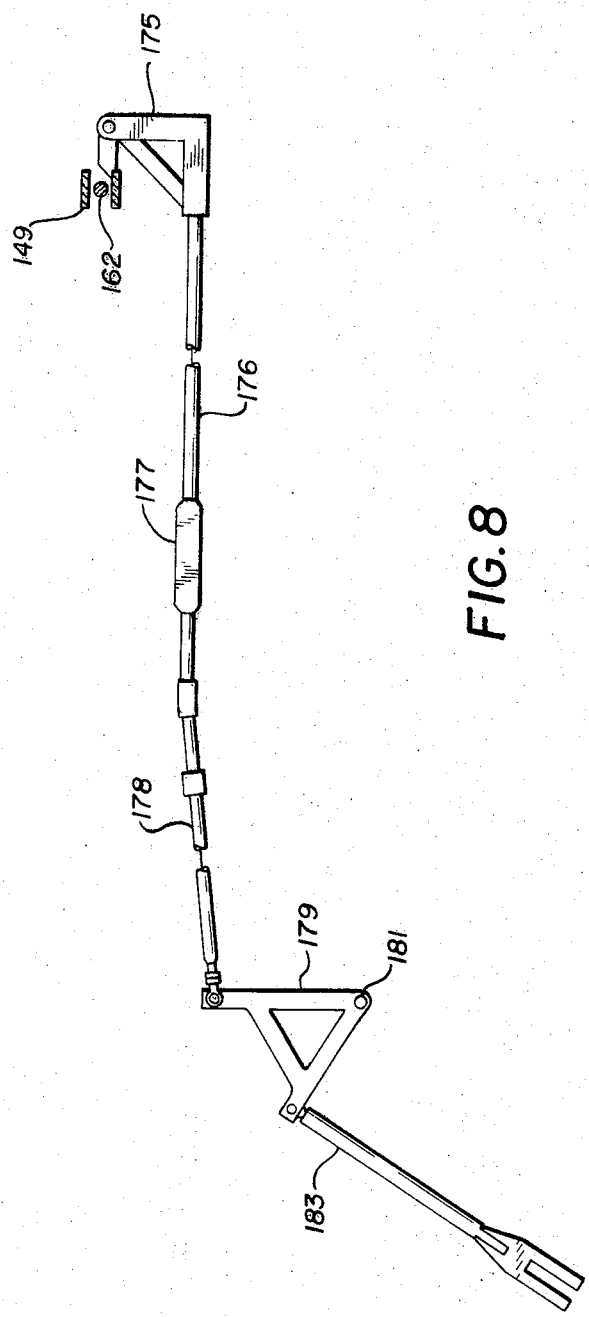
FIGURE 8 is a schematic illustration of the linkage for the centering and spacing device of the kiln loader, with portions broken away for clarity.
Figure 9:
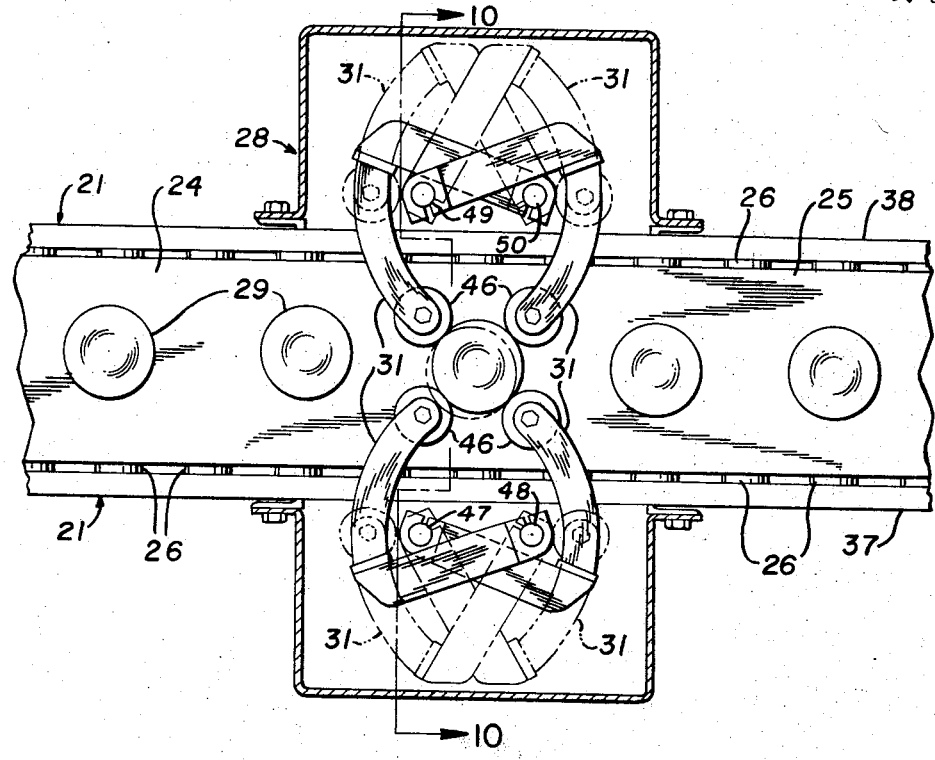
FIGURE 9 is a sectional view, the plane of the section being indicated by the line 9—9 in FIGURE 1.
Figure 10:
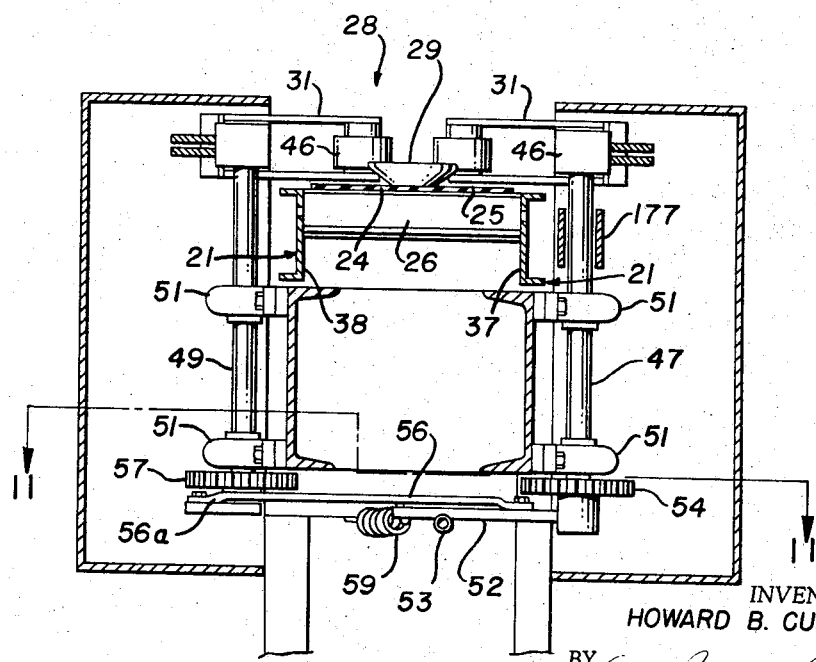
FIGURE 10 is a sectional view, the plane of the section being indicated by the line 10—10 in FIGURE 9.
Figure 15:
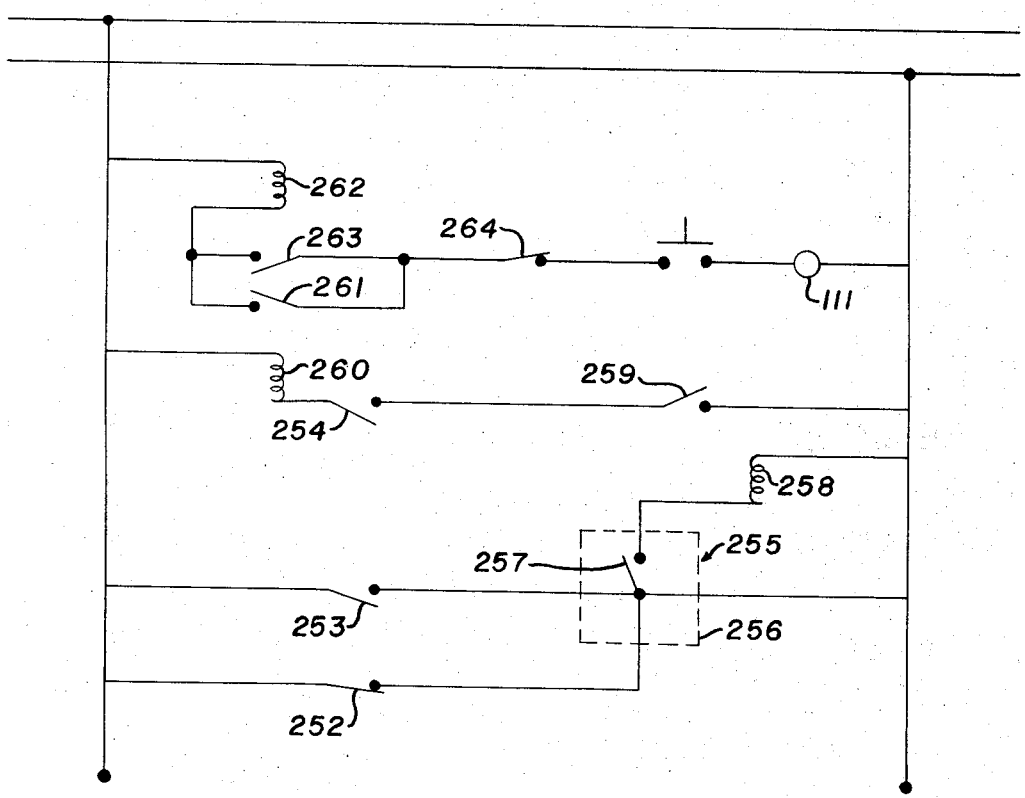
FIGURE 15 is a schematic wiring diagram for controlling certain operations of the machine.

As is apparent in FIGURES 2 and 5, the spindles 92 are moved together by a contraction of the lazy-tong frame 70 as the transfer frame 32 is swung over the bed 34 of the tunnel kiln 35 so that the ware may be closely spaced on the bed. Means also are provided to insure that the spindles 92 lay down a ware pattern on the bed 34 that is substantially symmetrical with respect to the longitudinal axis of the bed.

A centering arm 140 (1–5) is pivotally connected at one end to the spindle housing 86 by means of a roller bearing 141 (4). The other end of the centering arm 140 has upper and lower loops 142 and 143 (6) which are respectively pivotally connected to axially aligned upper and lower adjusting pins 144 and 145 (6) by roller bearings 146 and 147 (6), respectively. The upper adjusting pin 144 extends through an arcuate guide slot 148 (5, 6) provided in a housing 149 (5–8).

An interval spacing arm 150 (2, 3, 5) is pivotally connected at one end to the spindle housing 87 by means of a roller bearing (not shown but similar to the roller bearing 141). The other end of the interval spacing arm 150 has upper and lower loops 151 and 152 (6) which are, respectively, pivotally connected to axially aligned upper and lower adjusting pins 153 and 154 by roller bearings 155 and 156 (6), respectively. The upper adjusting pin 153 extends through the arcuate guide slot 148.

The upper and lower adjusting pins 144 and 145 protrude radially from one end of a hollow shaft 157 (6). The other end of the shaft 157 is provided with screw threads 158 (6) on which is threaded an adjusting wheel 159 (5–7). The adjusting wheel 159 is rotatably fixed with respect to the housing 149 by an anchor nut 160 (6) which is fixed to the housing 149.

The upper and lower adjusting pins 153 and 154 respectively, protrude radially from a bushing 161 (6) which is threaded onto a rod 162 (6). The rod is loosely received within the hollow shaft 157 for rotation within the bore of the shaft 157. The rod 162 extends beyond the end of the shaft 157 and is pinned to an adjusting handle 163 (5–7). The handle 163 is rotatably fixed with respect to the shaft 157 and retains the rod 162 against longitudinal movement within the bore of the shaft 157.

An off-center scale 164 (6, 7) is fixed to the housing 149 and an off-center pointer 165 (6) is fixed to the lower adjusting pin 145 which extends through an arcuate slot 166 (6). An interval or spacing scale 167 (6, 7) is fixed to the lower adjusting pin 145 and a spacing pointer 168 (6) is fixed to the lower adjusting pin 154 which extends through the arcuate slot 166.

The interval spacing arm 150 may be moved toward the centering arm 140 by turning the handle 163 in a clockwise direction and the interval spacing arm 100 may be removed away from the centering arm 140 by turning the handle 163 in a counterclockwise direction. The ends of the intervals spacing arm 150 and the centering arm 140 may be moved along the arcuate slot 148 while locked with respect to each other by turning the adjusting wheel 159.

Either of these adjusting operations may be accomplished without disturbing the spacing of the spindles 92 when the ware transfer frame 32 is positioned over the horizontal portion of the belt 24 since the centering arm 140 and the spacing arm 150 merely pivot about their spindle housings 86 and 87, respectively. To minimize any lateral displacement of the spindles 92 relative to each other and/or the guide track 60, the housing 149 is positioned so that the center of the arc defined by the slots 148 is located at the approximate mid-point of an imaginary line between the spindle housings 86 and 87.

The adjusted position of the centering arm 140 along the arcuate slot 148 determines the position of the spindle housing 86 when the ware transfer frame 32 is swung over the bed 34. When the ware transfer frame 32 is loading nine ware units 29 onto the bed, the adjusting wheel 159 is turned until the centering pointer 165 is at zero on the off-center scale 164. With the end of the centering arm 140 adjusted in this manner, the spindle 86 will be aligned with the longitudinal axis of the bed 34 when the frame 32 is located over the bed. In some instances, which will hereinafter be explained, the arm 140 is adusted so that the spindle housing 86 will be offset from this longitudinal axis.

The adjusted position of the spacing arm 150 along the arcuate track 148 determines the space between the spindle housings 86 and 87 and, therefore, because of the lazy-tong frame 70, determines the uniform spacing between all the spindles when the ware transfer frame 32 is swung over the bed. The spacing may be selected by turning the adjusting handle 163 until the spacing pointer 168 indicates the desired center-to-center distance between the spindles when the frame is over the bed. This distance is indicated on the spacing scale 167 in inches and may be selected so that the spindles are spaced apart distances of from three to eight inches to accommodate varying ware sizes. If the spindles are to be spaced less than eight inches apart when the ware is placed on the bed 34, the lazy-tong frame 70 will contract when the frame 32 swings. No contraction will occur if the spindles are to remain in their original spaced position of eight inches. If the spindle housing 86 is to be off center, however, the entire lazy-tong frame 70 will be reciprocated in the guide tracks 60. Contraction and reciprocation of the lazy-tong frame 70 will occur if the spindle housing 86 is to be off-center and the spindle-to-spindle distance is to be less than eight inches. Whatever spacing and/or centering adjustment that is selected, however, it should be noted that the spindles 92 will always return to the illustrated position over the horizontal portion of the belt 24 in which the spindles are spaced eight inches apart.

*Spindles jogging mechanism.*

A guide roller bracket 169 (6) is fixed to the housing 149 and slidingly suspends the housing 149 from a shaft 170 (6, 7) which is fixed to the column 113 and is parallel to the belt 24. The guide roller bracket 169 has a finger 171 (6, 7) which is provided with a guide roller 172 (6, 7). The guide roller 172 is received in a slot 173 (6). The slot 173 is parallel to the belt 24 and is provided in a bracket 174 (6, 7) which is fixed to the column 113. The guide roller 172 prevents the housing 149 from rotating with respect to the shaft 170 and guides the housing along the slot 173.

A bracket 175 (7, 8) is pivotally connected to the bottom of the housing 149 and the bracket 175 is in turn fixed to an actuating linkage 176 (1, 7, 8). The actuating linkage 176 extends along one side of the conveyor frame 21 and has a bifurcated portion 177 (8, 10) at the centering station 28 to provide clearance between the linkage 176 and the actuating rods 47 and 48. A link 178 (8, 12) is pivoted at one end to the actuating linkage 176 and is pivoted at its other end to a pivot link 179 (1, 2, 8, 12). The pivot link 179 is pivotally connected to a conveyor supporting member 180 (1, 12) by a pivot pin 181 (1, 12) and is periodically actuated against the bias of a spring 182 (12) by a push rod 183 (12) in a manner which will hereinafter become apparent.

The actuating linkage 176 is reciprocated during each dwell period of the belt 24 and, therefore, during the period when the ware transfer frame 32 is lowered so that its vacuum cups 33 contact the ware on the horizontal portion of the belt 24.

Figure 3:
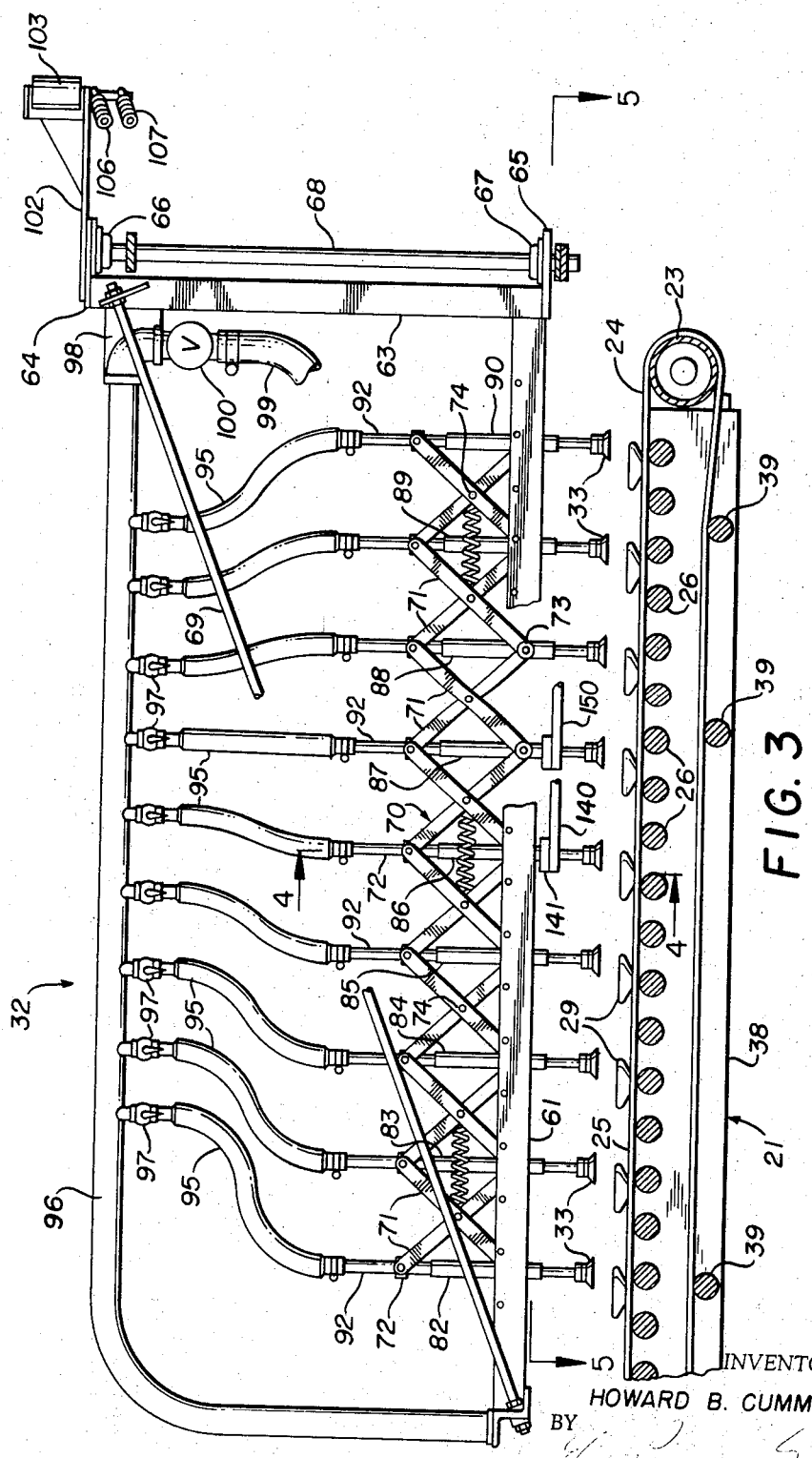
FIGURE 3 is a detailed sectional view of a portion of the kiln loader, with elements broken away for clarity, the plane of the section being indicated by the line 3—3 in FIGURE 2.
Figure 4:
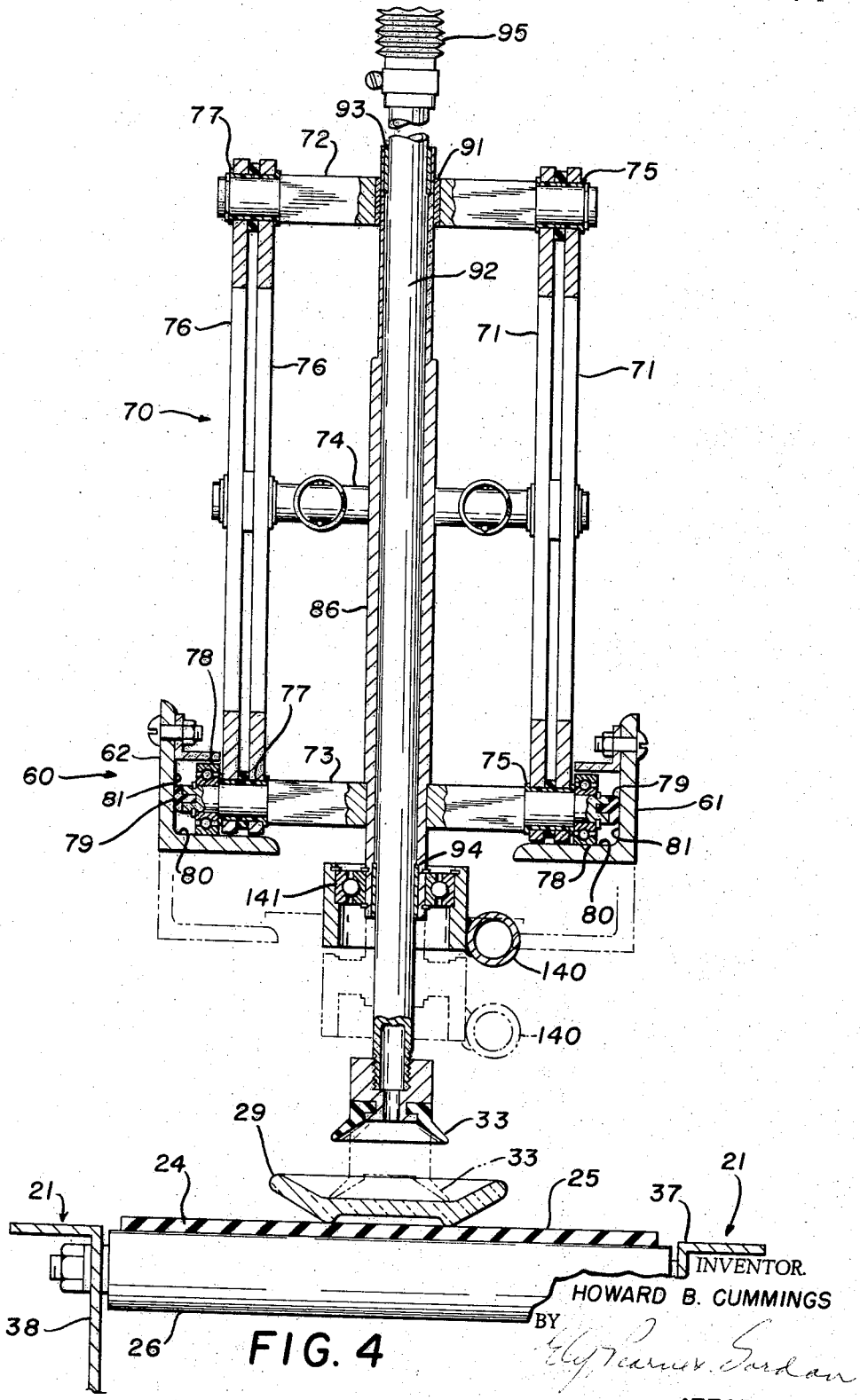
FIGURE 4 is a sectional view, the plane of the section being indicated by the line 4—4 in FIGURE 3.

The housing 149, the rods 140 and 150, and the spindles 92 are normally held by the actuating linkage 176 in the position shown in solid lines in FIGURES 3 and 5. As the transfer frame 32 drops to pick up the ware, the actuating linkage 176 will move to the left to pull the housing 149 and, therefore, the spindles 92 to the position shown in phantom outline in FIGURE 5. In this position the vacuum cups 33 will be centered with respect to each ware unit when the ware units are picked from the belt 24. Shortly before the precise moment of contact between each vacuum cup 33 and each ware unit 29, the actuating linkage 176 will begin pushing the housing 149 and, therefore, the spindles 92 back to their normal, off-center position.

The above described movements of the housing 149, rods 140 and 150 and the spindles 92 permit the transfer arm to pick up ware on the "fly" as the belt 24 decelerates to its dwell position at the transfer platform, the precise moment at which the cycle of the arm pick-up, delivery to the bed and return for the next cycle to the cycle of intermittent advance of the belt 24 commences. The reason for keying the conveyor belt cycle and the transfer arm cycle is this: For smaller sizes of ware in which successive rows must be closely packed on the bed of the kiln moving at a fixed speed, the time for completing both a conveyor belt cycle and a transfer arm cycle must be shortened, essentially at the sacrifice of the dwell period in the belt movement and the dwell of the arm at the end of its cycle. Thus, by keying the commencement of the arm movement to the end of the belt movement, there is no danger of the two cycles getting out of phase due to effective changes in their dwell periods.

*Belt drive*

A power input shaft 184 (12, 13) driven by a variable speed motor (not shown) leads into a cam and gear box housing 185 (1, 13). The shaft 184 is mounted for rotation in a drive shaft support frame 186 (12, 13) by flanged cartridge bearings 187 (13) (only one of which is shown). The shaft 184 is driven in a counterclockwise direction to drive a power output shaft 188 (12, 13) in a counterclockwise direction through reduction gears 189, 190, 191, and 192 (12, 13), respectively, as viewed in FIGURE 12. The reduction gears 190 and 191 are fixed to a shaft 193 (12, 13) which is mounted for rotation in the drive shaft support frame 186 by flanged cartridge bearings 194 (13). The reduction gear 192 is fixed to the power output shaft 188 which is mounted for rotation in the support frame by bearings 195 (13). One end of the shaft 188 extends through and outwardly beyond the frame 186 and a sprocket wheel 196 (12, 13) is eccentrically mounted on the end of the shaft 188. The sprocket wheel 196 is eccentrically mounted so that a sprocket tooth 197 (12, 13) is aligned with the axis of the shaft 188. Upon rotation of the shaft 188 the sprocket wheel 196, in effect, pivots about the tooth 197.

A link chain 198 (12) is wrapped around the sprocket wheel 196, around a sprocket wheel 199 (12), which is fixed to the drive roll 30, an idler sprocket wheel 200 (12) which is rotatably mounted on one end of an idler arm 201 (12) and finally around an idler sprocket wheel 202 (12) which is rotatably mounted on the end of the idling roll 40.

The drive roll 30 is advanced a peripheral distance of eight inches during each rotation of the continuously driven shaft 188. This advance of the drive roll 30 occurs only when a driving reach 203 (12) of the chain 198 does not intersect the axis of the shaft 188. This relationship occurs only when the sprocket wheel 196 is positioned to the right of the shaft 188, as viewed in FIGURE 12, and the axes of the sprocket wheel 196 and the shaft 188 lie in a common horizontal plane. In this position, the tooth 197 is at the point of tangency between the driving reach 203 and the sprocket wheel 196. Since this tooth merely pivots, however, the chain 198, and therefore, the driving roll 30, will not be driven until the adjacent tooth engages the chain.

In FIGURE 12, the sprocket wheel 196 is driving the chain 198, and, therefore, the driving roll 30, at their maximum velocities. At this point the belt 24 has already been advanced four inches and will be advanced four more inches until the belt 24 reaches a condition of zero velocity.

The previously described pivotal movement of the sprocket wheel 196 not only drives the chain 198, but also periodically increases and decreases the length of the driving reach 203 and a return reach 204 (12). Any slack that might occur in the chain 198 under these circumstances, is taken up by the idler arm 201 and its sprocket 200. The idler arm 201 is pivotally connected to the conveyor frame by a pivot pin 205 (12) and is biased downwardly by a coil spring 206 (12).

Spindle jogging control mechanism

The power output shaft 188 has a second end which extends through the support frame 186. Sprocket wheels 207 (12) and 208 (12) are fixed to this shaft end and, respectively, to drive sprocket wheels 209 (13) and 210 (12, 13), through link chains 211 (13) and 212 (12, 13). The sprockets 210 and 209 are, respectively, fixed to upper and lower cam shafts 213 (12, 13) and 214 (12). Fixed to the lower cam shaft 214, for counter-clockwise rotation therewith, (as viewed in FIGURE 12) is a push rod cam 215 (12, 13), and fixed to the upper cam shaft 213, for counter-clockwise rotation therewith (as viewed in FIGURE 12) are a tachometer reset cam 216, a tachometer count cam 217, a motor starting cam 218, a latch holding cam 219, and an air valve operating cam 220 (13). The sprocket wheels 209 and 210 are of the same diameter and are selected so that a two-to-one ratio exists between the sprockets 207 and 208, and the sprockets 209 and 210 to rotate the cam shafts 213 and 214 once for every two revolutions of the power output shaft 188.

The push rod cam 215 has two lobes 221 and 222 (12) and recessed portions 223 and 224 (12). A cam follower 225 (12, 13) is fixed to the push rod 183 and rides on the cam 215. The lobes 221 and 222 hold the housing 149 in the previously described normal position wherein the spindles 92 are off-center from the ware units. During the counter-clockwise rotation of the cam 215 the cam follower 225 will be urged into the recessed portions of the cam and the push rod will reciprocate to cause the above described jogging of the spindles.

The cam 215 is positioned on its cam shaft 214 so that the cam follower 225 will reach its lowest point in the recessed portions when the velocity of the belt 24 is zero.

The double lobe and double recess configuration of the cam 215 causes the spindles to jog at each dwell period of the belt.

In some instances it is desirable or necessary to load the ware onto the belt on sixteen-inch, rather than eight-inch, centers. For example, when firing large service platters having a major axis which is greater than eight inches but less than sixteen inches, the ware would be placed on alternate spindles of the glazing table. The ware would be unloaded from the spindles by alternate vacuum cups of a ware unloader and would be placed on the belt on sixteen-inch centers, i.e. during alternate dwell periods of the belt 24. If this ware is to be loaded by hand on the belt 24, the operator would merely place the ware on alternate ware locating marks on the belt and/or during alternate dwell periods.

In these instances the push rod 183 would be actuated by the push rod cam 215 during alternate dwell periods. To this end a latch 226 (12, 14) is pivotally connected at one end to the conveyor frame 21. The other end of the latch 226 is provided with a dog 227 (14) which extends outwardly to engage a projection 228 (14) on the pivot link 179. A bumper plate 229 (14) is fixed to the latch 226 and extends inwardly under the frame 21. The latch 226 and its dog 227 are normally pivoted upwardly and held so that the projection 228 on the pivot link 179 clears the dog 227 and the push rod 183 is permitted to drop into the recesses 223 and 224 during each dwell period of the belt 24. This position is maintained by a piston 230 (14) of an air clamp or cylinder 231 (14) to push the bumper plate 229 upwardly at the limit of its power stroke by pinning a cam lever 232 (12, 13) of a 3-way valve 233 (12) in an on position to connect the cylinder 231 to a source of pressurized air (not shown) through air lines 234 and 235 (12), respectively.

When the push rod 183 is to operate at alternate dwell periods, the cam lever 232 is unpinned and is periodically actuated by the single lobed, air valve operating cam 219. The cam 219 is positioned on the upper cam shaft 213 so that its lobe trips the cam lever 232 during the period of time required for the cam follower 225 to ride off the lobe 221 and into the recessed portion 223. Actuation of the piston 231 permits the projection 228 to clear the dog 227 so that the cam follower 225 can engage the recessed portion 223. When the cam follower rides up on the lobe 222, a beveled portion 236 (14) of the projection 228 will lift the dog 227 against the bias of a spring 237 (12) and the dog 227 will drop into locking engagement with the projection 228. This locking relationship will exist until the cam follower 225 again approaches the recessed portion 223 and, because of the two-to-one relationship between the shafts 118 and 214, the pivot link 179 is unlocked only at alternate dwell periods.

Ware centering and spacing actuating control mechanism

A cam 238 (12, 13) is fixed to the power output shaft 188 for counter-clockwise rotation therewith. A cam follower 239 (12, 13) is mounted on a pivot link 240 (12, 13) which is pivoted to the lower cam shaft 214. A rod 241 (12, 13) is pivoted at one end to the pivot link 240 and is pivotally connected at its other end to a pivot plate 242 (12). The pivot plate is rotatably mounted on the pivot pin 181. The rod 53 which extends to the centering mechanism is pivoted to the plate.

The cam follower 239 is biased to ride on an arcuate portion 243 (12) and a recessed portion 244 (12) of the cam 238 by the spring 59. The cam 238 is fixed to the power output shaft 188 so that the cam follower 239 rides on the arcuate portion 243 of the cam 238 during the periods when the belt 24 is being advanced, and rides on the recessed portion 244 of the cam 238 during the dwell periods. When the cam follower 239 is riding on the arcuate portion 243 the rod 53 and its linkage member 52 is in the position shown in phantom outline in FIGURE 11 and the arms 31 are retracted to permit the ware to advance.

Means are provided to cause actuation of the centering arms 31 during alternate dwell periods of the belt in the event that the ware is placed on sixteen-inch centers in the previously described manner. A latch arm 245 (12) is pivotally connected at one end to the power output shaft 188. The free end of the latch arm 245 is provided with a cam follower 246 (12) which rides on the cam 219. The latch arm 245 is provided with a notch 247 (12) which engages a projection 248 (12) on the pivot link 240. The cam 219 is positioned on its shaft 213 to lift the arm 245 out of locking engagement with the projection 248 when the recessed portion 244 of the cam 238 is about to be traversed by the cam follower 239. Since the upper cam shaft 213 completes one revolution for every two revolutions of the power output shaft 188, the projection 248 is unlocked only during alternate dwell periods of the belt 24.

When the ware is loaded onto the belt on eight inch centers, the latch arm is maintained in a raised or unlocked position with respect to the pivot link 240 by a hand operated cam 249 (12). The cam 249 is fixed to a shaft 250 (12) which is mounted for rotation in the frame 186 by a handle 251 (12).

*Transfer frame motor and tachometer circuit*

A normally closed tachometer reset switch 252 (13, 15), a normally open tachometer count switch 253 (13, 15), and a normally open transfer frame motor starting switch 254 (13, 15) are mounted in the support frame 186 to be respectively actuated by the tachometer reset cam 216, the tachometer count cam 217, and the motor starting cam 218. The count switch 253 is closed by the double lobed count cam 217 midway between each dwell period of the belt. Each closure of the switch 253 feeds an electrical counting impulse into a conventional switching tachometer 255 (15) which is located in a control box 256 (1, 7). The tachometer 255 is provided with a normally open switch 257 (15) which closes only when a preselected number of counting impulses are fed into the tachometer 255.

The reset switch 252 is opened by the double lobed reset cam 216 after each dwell period but before each actuation of the count switch 253. The switch 257 remains closed, after being closed by the preselected number of counting impulses, until the reset switch 252 is energized at which time the switch 257 will open and the tachometer will be returned to a zero count condition. When the switch 257 is closed a coil 258 (15) will be energized and a normally open switch 259 (15) will be closed. The coil 258 is energized and the switch 259 is closed only after the preselected number of counting impulses are fed into the tachometer 255.

The motor starting switch 254 is closed by the double lobed motor starting cam 218 just prior to each dwell period. If the normally open switch 259 has been closed by its coil 258 the closure of the starting switch 254 will energize a coil 260 (15) to thereby close a normally open switch 261 (15). When the switch 261 is closed the motor 111 will be energized to start the previously described rotational movement of the barrel cam 128 and the cam plate 105. The closure of the switch 261 also energizes a coil 262 (15) which, in turn, closes a normally open switch 263 (15). The coil 262 and the switch 263 serve as a holding circuit for the motor 111 when the switch 254 rides off the motor starting cam 218 and is thereby opened to de-energize the coil 260 and open the switch 261.

The motor 111 will continue to run until a normally closed limit switch 264 (7, 15) is opened. The limit switch 264 is mounted on the frame member 108 and is momentarily opened by a finger 265 which is fixed to the barrel cam 128. The finger 265 (7) is positioned on the barrel cam 128 so that the limit switch 264 will be momentarily opened and the barrel cam 128 will stop its rotation just prior to the time when the cam follower 127 will drop into the recessed portion 131 of the barrel cam 128.

The scope of the invention is not limited to the practice of all the structural and operative details mentioned above. These have been given merely by way of an example of a presently preferred embodiment of the invention.

What is claimed is:

1. Apparatus for loading ware to be fired in a kiln in which ware is conveyed therethrough on a moving conveyor ebd comprising a conveyor for conveying ware from a loading station to a delivery station adjacent the entrance of the kiln, said delivery station comprising a portion of the run of said conveyor parallel to said kiln conveyor bed, means between said loading station and said delivery station to locate said ware on equally spaced centers on said conveyor at said delivery station, a transfer arm, means to swing said transfer arm cyclically from a position parallel to said conveyor at said delivery station to a position over said bed at an angle not exceeding 90° with respect to its movement of said bed and thence to its original position parrallel to said conveyor, a plurality of aligned ware pick-up means movably mounted on said transfer arm, said pick-up means, when said transfer arm is parallel to said conveyor being centered above said conveyor at said delivery station and spaced from each other a distance equal to the spacing between ware at said delivery station, means to selectively activate a number of said pick-up means equal to the number of pieces of ware which may be spaced equal from each other over said bed when said arm is swung over said bed, means to activate said selected number of pick-up means when pieces of ware of a group of equal number are brought toward a position beneath said pick-up means at said delivery station, whereby said group will be picked up by said pick-up means to move said pick-up means equally with respect to each other as said arm is swung over said bed, means to deactivate said pick-up means and deposit the group of pieces of ware on said bed when said arm reaches its ultimate position of swing over said bed, the spacing of said pick-up means during the swinging movement of said arm being such as to space said ware equally along a line across said bed.

2. Apparatus as defined in claim 1 in which the cyclic swinging of said arm is timed with respect to the movement of said bed to space ware in successive rows equally to the spacing between ware in a given row.

3. Apparatus as defined in claim 2 in which the position to which said arm is swung over said bed is at 60° to the direction of movement of said bed.

4. Apparatus as defined in claim 1 in which said ware pick-up means each comprises a vacuum cup carried by a hollow spindle, a vacuum manifold to which each spindle is connected, a valve in each spindle to permit it to be selectively actuated by said manifold.

5. Apparatus as defined in claim 4 including a valve in said manifold and means to actuate said manifold valve in synchronism with the means to swing said transfer arm.

6. Apparatus as defined in claim 5 including means to drive said ware conveyor intermittently in successive movement and dwell periods.

7. Apparatus as defined in claim 6 to vary the time of the cycles of swinging said arm and driving said belt in synchronism with each other but in periods decreasing in length as the number of pieces of ware to be deposited on said conveyor bed is increased.

8. Apparatus as defined in claim 5 in which the actuation of said pick-up means to pick up ware from said conveyor is timed to the commencement of a dwell period in the drive of said conveyor.

9. Apparatus as defined in claim 8 including means to move said pick-up means in the direction of travel of said conveyor as said pick-up means are actuated.

References Cited

UNITED STATES PATENTS

| 2,647,613 | 8/1953 | Launius | 198—31 |
| 2,666,562 | 1/1954 | Birch | 214—309 X |
| 3,028,028 | 4/1962 | Nilsson | 198—34 X |

FOREIGN PATENTS

| 163,068 | 4/1958 | Sweden. |
| 890,102 | 2/1962 | Great Britain. |

EDWARD A. SROKA, *Primary Examiner.*

EVON C. BLUNK, *Examiner.*